United States Patent [19]

Synosky et al.

[11] Patent Number: 5,116,626
[45] Date of Patent: May 26, 1992

[54] TRANSPARENT BASE AND GUM COMPOSITION

[75] Inventors: Steven P. Synosky, Green Brook; Dinah Diaz, Edison; Scott E. Hartman, Roosevelt, all of N.J.

[73] Assignee: Wm. Wrigley Jr. Company, Chicago, Ill.

[21] Appl. No.: 736,028

[22] Filed: Jul. 25, 1991

[51] Int. Cl.⁵ .............................................. A23G 3/30
[52] U.S. Cl. ........................................... 426/3; 426/5; 426/6
[58] Field of Search ........................................ 426/3-6

[56] References Cited

U.S. PATENT DOCUMENTS

| | | | |
|---|---|---|---|
| 3,995,064 | 11/1976 | Ehrgott et al. | 426/3 |
| 4,352,822 | 9/1985 | Cherukuri et al. | 426/3 RE |
| 4,794,003 | 12/1988 | Cherukuri et al. | 426/3 |
| 4,834,986 | 5/1989 | Glass et al. | 426/3 |
| 4,872,884 | 10/1989 | Cherukuri et al. | 426/3 |
| 4,933,189 | 6/1990 | Cherukuri et al. | 426/3 |

*Primary Examiner*—Jeanette Hunter
*Attorney, Agent, or Firm*—Willian Brinks Olds Hofer Gilson & Lione

[57] ABSTRACT

A gum base and gum that have a light transmittance greater than 60%.

58 Claims, No Drawings

TRANSPARENT BASE AND GUM COMPOSITION

TECHNICAL FIELD

The present invention relates to a gum base and gum composition that is substantially transparent.

BACKGROUND OF THE INVENTION

Conventional chewing and bubble gum bases generally contain elastomers, elastomer plasticizers, fillers, waxes, and softeners. The elastomers include natural rubber such as smoked or liquid latex and guayule, natural gums such as jelutong, lechi caspi perillo, massaranduba balata, massaranduba chocolate, nespero, rosidinha, chicle, gutta percha, gutta kataiu, niger gutta, tunu, chilte, chiquibul, gutta hang kang and synthetic rubber such as butadiene-styrene copolymers, polyisobutylene, isobutylene-isoprene copolymers, polybutadiene, vinyl polymers such as polyvinyl acetate, vinyl copolymers such as vinyl acetate/vinyl laurate, ethylene/vinyl acetate and the like.

Typical elastomer plasticizers are natural rosin esters such as glycerol ester of partially hydrogenated rosin, glycerol ester of polymerized rosin, glycerol ester of partially dimerized rosin, glycerol ester of rosin, glycerol ester of tall oil rosin, pentaerythritol esters of partially hydrogenated rosin, partially hydrogenated methyl esters of rosin, pentaerythritol ester and synthetic resins such as terpene resins derived from alpha-pinene, beta-pinene and d-limonene.

Typical waxes are synthetic waxes such as polyethylene and Fischer-Tropsch waxes, natural waxes such as candelilla, carnauba, beeswax, rice bran or petroleum waxes such as microcrystalline and paraffin.

Typical fillers include carbonate types such as magnesium and calcium carbonate, ground limestone and silicate types such as magnesium and aluminum silicate, clay, alumina, talc, as well as titanium oxide, mono-, di- and tri-calcium phosphate, cellulose polymers such as ethyl, methyl and wood and the like.

Typical softeners include hydrogenated vegetable oil, nonhydrogenated vegetable oil, lard, hydrogenated tallow, coca butter, glycerol monostearate, lecithin, mono-, di- and triglycerides, acetylated mono-, di- and triglycerides, distilled mono-, di- or triglycerides, glycerol triacetate, fatty acids such as stearic palmitic, oleic linoleic and linolenic and the like.

Other ingredients such as antioxidants and colorants may also be present.

Conventional chewing gums using these gum bases generally contain water-soluble, natural or artificial bulk sweeteners, water-soluble binding syrups, natural and artificial, liquid or dried flavorants, softeners and emulsifiers.

Conventional gums generally use water-soluble natural or artificial bulk sweeteners such as sucrose, dextrose and sorbitol, along with binding syrups such as corn syrup, starch hydrolysates and 70% sorbitol solution. Conventional gums also include natural and artificial, and liquid or dried flavorants, softeners such as glycerine, propylene glycol, ad emulsifiers such as glycerol monostearate or lecithin.

Skilled artisans have combined these ingredients in various ways to create chewing gums and bubble gums that have various flavors, good texture and mouth feel, and (in the case of bubble gums) good elasticity and bubble characteristics.

Due to the combinations, types and levels of ingredients used in conventional gum base and gum products, however, they tend to be visually opaque when formed into the final shape and will either block or greatly diffuse the transmittance of visible light.

SUMMARY OF THE INVENTION

This invention is a transparent gum base and transparent finished gum composition. The transparent gum composition of this invention comprises:

from abut 70.0 percent to about 95.0 percent by weight of one or more elastomers selected from the group consisting of a polyvinyl acetate having an average GPC molecular weight from about 2,000 to about 85,000, a polyisobutylene having an average GPC molecular weight from about 50,000 to about 95,000, and a vinyl laurate-vinyl acetate copolymer having an average vinyl laurate content from about 10.0 percent to about 60.0 percent by weight of t he copolymer;

from about 1.0 percent to about 20.0 percent by weight of one or more softeners selected from the group consisting of glycerol triacetate, mon-, di- or triglycerides or acetylates mono-, di- or triglycerides and preferably those having a saponification number greater than about 350 and even more preferably greater than 400.

less than 1 percent by weight filler, wherein the gum base has a light transmittance of at least 60 percent using ASTM Method D1746-35, and a softening point of from about 40° C. to about 90° C.

The transparent gum composition of this invention comprises at least 75.0 percent by weight of the transparent gum base of t his invention; no more than about 10.0 percent of oil-or water-soluble flavoring; and no more that about one percent of a high-intensity sweetener wherein the transmittal of light is at least 60 percent.

Optional opaque ingredients may be included in either the gum base or finished gum composition at low levels so as to maintain the light transmittance above 60 percent. Preferably, the amount of opaque ingredients is below 5.0 percent.

Other features of this invention will be apparent from the detailed description below.

DETAILED DESCRIPTION OF THE PREFERRED EMBODIMENTS

A. The Transparent Gum Base Elastomer

As described above, the transparent gum base elastomer can be polyvinyl acetate (PVA) having an average GPC molecular weight from abut 2,000 to 85,000. Maintaining an average GPC molecular weight can be accomplished in several ways. First, the PVA can be selected so it clearly falls within the range. Also, a blend of PVAs of different molecular weights can be formulated so that the *average* molecular weight falls within this range.

For example, a blend of a low molecular weight PVA (e.g. from 2,000 to 15,000, preferably from 10,000 to 14,000) and a high molecular weight PVA (e.g. from 45,000 to 95,000, preferably from 46,000 to 55,000) can be made. Preferably, the ratio of high to low molecular weight PVA is from 2 1 to 1:9.

Alternatively, a blend of a medium molecular weight PVA (e.g. from 15,000 to 45,000, preferably from 25,000 to 35,000) and the low molecular weight PVA previously described can be made. Preferably, the ratio of medium to low molecular weight PVA is from 7:1 to 1:7.

Also, a blend of a high molecular weight PVA (e.g. from 45,000 to 95,000, preferably 46,000 to 55,000) and the medium molecular weight PVA previously described can be made. Preferably, the ratio of high to medium molecular weight PVA in such a blend is from 1:1 to 1:8.

However, the molecular weight of the PVA is controlled to be within the range of 2,000 to 85,000, it is preferred that the molecular weight of the PVA be between 7,000 and 60,000, and more preferably 10,000 and 30,000. While PVA can be used in the gum base in amounts from 70.0 to 95.0 percent, the preferred amounts range from 85.0 to 95.0 percent if PVA is the sole elastomer.

It is also possible to use a polyisobutylene as a gum base elastomer having a GPC molecular weight from 50,000 to 85,000, as mentioned previously. Preferably, polyisobutylene is used in combination with a PVA so that the polyisobutylene content is no more than about 40.0 percent by weight of the base, preferably from 5.0 to 35.0 percent, and more preferably from 17.0 to 31.0 percent. When polyisobutylene is used in combination with another elastomer such as PVA, the GPC average molecular weight of the elastomer mixture is from 45,000 to 90,000 and preferably from about 55,000 to about 80,000.

A vinyl laurate/vinyl acetate copolymer can also be used as an elastomer in the gum base of this invention. Preferably, that copolymer has a vinyl laurate content of from 10.0 to 60.0 percent, preferably from 15.0 to 45.0 percent.

Other substantially transparent polymers (e.g. ethylene vinyl acetate) can be used. However, their levels should be less than about 10% of the gum base because for ethylene vinyl acetate levels exceeding about 10% by weight create problems with texture in the finished gum products.

B. The Transparent Gum Base Softener

As set forth above, the amount of softener in the gum base of this invention is from 1.0 percent to 20.0 percent by weight. The preferred softeners are those that are themselves substantially transparent (e.g. glycerol triacetate, acetylated monoglycerides, preferably acetylated monoglycerides having saponification values above 400, and fats and oils having melting points above 65° F. (the storage temperatures of the gum). Preferably, such transparent softeners are included in an amount ranging from 3.0 to 12.0 percent by weight of the gum base.

Opaque softeners can be employed at low levels (less than about 5.0 percent by weight) in the gum base. Typically low levels of opaque softeners may be used because of their strong elastomer softening capability. They include but are not limited to hydrogenated vegetable oil, lard, hydrogenated tallow, cocoa butter, glycerol monostearate, lecithin, mono-, di- and triglycerides, acetylated mono-, di- and triglycerides, distilled mono-, di- and triglycerides, glycerol triacetate, fatty acids such as stearic, palmitic, oleic, linoleic and linolenic and the like.

Preferably, with the preferred polyvinyl acetate elastomer, glycerol triacetate and mono-, di-, and triglycerides including those having a saponification number greater than 400 are employed. Even more preferred is glycerol triacetate used from about 3.0 percent to about 12.0 percent by weight of the gum base.

All or a portion of the total gum base may be added during the finished gum production. It is preferable, however, to add the majority of or all of the softener during the base production. Examples of adding softener in the gum composition are when the softener is present in the center-filling, (e.g. flavor oils as well as others including opaque types), and those added before or after the gum base is added in the gum production process, (e.g. those mentioned transparent softeners as well as less than about 5.0 percent of the opaque softeners, by weight of the gum composition).

C. Fillers

The fillers in the present invention can be employed below about 1 percent by weight of the transparent base. Preferably the base is free of filler. The filler used in the present invention may include but is not limited to carbonate types such as magnesium and calcium carbonate, and ground limestone, and silicate types such as magnesium and aluminum silicate, clay, alumina, talc, as well as titanium oxide, mono-, di- and tricalcium phosphate, and cellulose polymers such as ethyl, and methyl cellulose and wood and the like.

D. Optional Base Ingredients

Optionally, other typical gum base ingredients that are not in themselves transparent may be included in the present invention provided they are present at a level below from about 5.0 percent by weight of the gum base and preferably below about 3.0 percent. Such optional ingredients include but are not limited to synthetic rubber such as butadiene-styrene copolymers, isobutylene-isoprene, elastomer plasticizers such as natural rosin esters such as glycerol ester of partially hydrogenated rosin, glycerol ester of polymerized rosin, glycerol ester of partially dimerized rosin, glycerol ester of rosin, glycerol ester of tall oil rosin, pentaerythritol esters of partially hydrogenated rosin, partially hydrogenated methyl esters of rosin, pentaerythritol ester and synthetic resins such as terpene resins derived from alpha-pinene, beta-i-pinene and d-limonene, synthetic waxes such as polyethylene and Fischer-Tropsch waxes, natural waxes such as candelilla, carnauba, beeswax, rice bran or petroleum waxes such as microcrystalline and paraffin and the like. Use of these optional ingredients may be to improve the flavor profile of the gum.

Preferably hydrogenated and partially hydrogenated vegetable oils are used and even more preferably from about 1.0 percent to about 5.0 percent partially hydrogenated vegetable oil by weight of the gum base.

E. Transmittance

As set forth above, the transmittance of the gum base and finished gum of this invention (exclusive of an opaque-type center-filling) is greater than 60 percent, preferably greater than 80 percent, as measured by ASTM D1746-35. Colorants can be added to the base and/or finished gum that may reduce the transmittance below 60 percent for the particular wavelength of light the colorant absorbs. Such colored bases and gum compositions are within the scope of the present invention if the total visible light transmittance is 60 percent or greater.

F. Gum Base Preparation

The base of the invention is typically prepared by adding an amount of the elastomer and softener to a heated sigma blade mixer with a front to rear speed ratio of typically 2:1. The initial amounts of ingredients is determined by the working capacity of the mixing kettle in order to attain a proper consistency. After the initial ingredients have massed homogeneously, the balance of the softener and/or optional ingredients aforementioned is/are added in a sequential manner until a completely homogeneous molten mass is attained. This can usually be achieved in one-half to three hours, depending on the formulation. The final mass temperature can be between 70° C. and 130° C. and preferably between 100° and 120° C. The completed molten mass is emptied from the mixing kettle into coated or lined pans, extruded or cast into any desirable shape and allowed to cool and solidify.

The use of a vacuum connected to the mixing chamber of the heated mixer is important. Since processing of the inventive gum base produces air bubbles which, upon cooling of the base, become entrapped and can result in an opaque product. While the vacuum method can be used, any means of vacuum processing applied to the gum base or to the gum made using said base or to either of their processes and which removes entrapped air may also be utilized.

Transparent bases of this invention such as those set forth in Tables I-II below may be prepared by adding the transparent ingredients to a pre-heated steel sigma blade mixer. The ingredients can be comminuted previously to reduce strain on the mixer. Various means of eliminating or prohibiting air bubble formation during mixing can be used, but vacuum is the preferred method. A mixer specially fitted with a vacuum cover can be used to achieve a low pressure (1-3 in. Hg) in the mixer to eliminate any air bubbles that may become entrapped in the final compound. Reducing the air trapped in the base improves the transmittance of light through the finished base.

G. Finished Gum Composition

The inventive gum consists of from about 75 percent to about 100 percent of inventive base and preferably from about 95 percent to about 100 percent by weight of the gum composition.

The final gum product (e.g. center filled gum having a transparent outer portion encasing a colored and visible center-filling) is also essentially transparent and can be likened in appearance to a typical hard candy.

Flavorants and sweeteners may also be eliminated from the finished gum mass itself and instead incorporated into a center-filling. In this approach, the base portion of the gum would consist of entirely suitable transparent base ingredients wherein the colors, flavors, sweeteners and the like are incorporated into a center-filling, and released only during chewing to commingle with the transparent base shell. Special equipment is necessary for center-filling, such as a Hamac-Holler Uniplast, and others well known in the industry. The center-filling may be either a dry powder consisting of water-soluble colors, sweeteners such as sucrose, xylitol, dextrose, fructose and spray-dried flavors. It may also be a liquid or semi-viscous fluid consisting largely of syrups such as high fructose corn syrup, regular corn syrup, hydrogenated corn syrup, sorbitol solution, water, glycerine, propylene glycol and thickeners such as methylcellulose and vegetable gums, sweeteners such as xylitol, sucrose, aspartame, thaumatin, monellin, alitame, acesulfame-potassium, saccharin, colors and liquid or dry flavorants.

The center-filling need not be transparent. The outer "shell" of transparent chewing gum or base can be transparent, permitting the consumer to see the center-filling that can be colored to impart an interesting and attractive appearance to the finished gum.

Depending upon the use of the product, powdered or liquid medicaments such as vitamins can be incorporated in the center-filling.

The shape of the final product will depend upon the dies used in the forming machine. Dies such as those used in the candy industry are preferred, since this gum is flexible and plastic when warm, but yields a very sharp glass transition (Tg) upon cooling and sticking to the dies is virtually eliminated. The glass transition temperature is a rheological value that is obtained when a polymer passes from a glassy state to a rubbery or liquid state. This occurs when the storage modulus ($G''$) of a polymer is equivalent to 13 dynes/cm as measured on a rheometer.

The gum base and finished gum described above can be prepared in a number of different ways. Several examples are provided below that are intended to illustrate, but not limit, this invention. Table I and II provide formulations of gum bases of this invention. Table I further provides examples (G and H) of "controls" that are not substantially transparent. Table III provides examples of finished gum compositions of this invention.

The initial amounts and sequence of ingredient addition to the mixer depends on the size, working capacity and horsepower of the mixer. Preferably, the comminuted elastomer is allowed to soften or compound in the mixer at typically slow speed until workable into a mass to which the transparent softeners are added sequentially until a completely homogeneous mixture is attained. This can take from fifteen minutes to two hours, preferably thirty minutes to one hour, depending upon the amount of heat used and the base formulation used. A final temperature of between 50° C. and 150° C. and preferably between 90° C. and 120° C. is typical. The completed molten mass can be emptied from the mixer into coated or lined pans or put into an extruder and processed into small pellets to cool and solidify. The base mixture can also be cooled in the mixer using cooling jackets. Thus, the same mixer (with the vacuum equipment) can be used to prepare the finished gum following the procedures described below.

TABLE I

|  | Transparent Bases | | | | | | Controls | |
|---|---|---|---|---|---|---|---|---|
|  | A | B | C | D | E | F | G | H |
| ELASTOMERS | | | | | | | | |
| Polyvinyl Acetate | | | | | | | | |
| Low Mw | 72 | 40 | — | — | 85 | — | — | 54 |
| Medium Mw | — | 40 | 60 | 70 | — | — | — | 15 |
| High Mw | 20 | — | 5 | — | — | — | 25 | |
| Polyisobutylene | — | — | 25 | 15 | 5 | 14 | 10 | 15 |
| Vinyl Laurate/Vinyl Acetate Copolymer | — | — | — | — | — | 60 | — | — |

TABLE I-continued

| | Transparent Bases | | | | | | Controls | |
|---|---|---|---|---|---|---|---|---|
| | A | B | C | D | E | F | G | H |
| SOFTENERS | | | | | | | | |
| Glycerol Triacetate | 5 | 3 | — | 10 | 5 | — | 5 | 5 |
| Glycerides | — | 4.6 | — | — | — | — | 2 | — |
| Acetylated Glycerides | — | — | 5 | — | — | 20 | — | 2 |
| FILLER | | | | | | | | |
| CaCO3 | 1 | — | — | — | — | — | — | 3 |
| Talc | — | — | — | — | — | 1 | 25 | — |
| OPTIONAL OPAQUE INGREDIENT | | | | | | | | |
| Terpene Resins | 1 | — | — | — | — | — | — | 3 |
| Rosin Esters | — | — | — | — | — | — | 18 | — |
| Hydrogenated Veg. Oils | — | — | — | 5 | 5 | — | — | 1.7 |
| Butyl Elastomer | — | 5 | — | — | — | — | — | — |
| Wax | — | — | 4 | — | — | — | 15 | — |
| FLAVORANT | | | | | | | | |
| Oil-soluble | — | — | — | — | — | 5 | — | 1 |
| Water-soluble | — | 7 | — | — | — | — | — | — |
| Spray-dried | 1 | — | — | — | — | — | — | — |
| INTENSE SWEETENER | | | | | | | | |
| Aspartame | — | — | 1 | — | — | — | — | 0.3 |
| Thaumatin | — | 0.4 | — | — | — | — | — | — |
| | | | | | 100% | | | |

The light transmittance of bases "G" & "H" are less than 10 percent and less than 60 percent respectively.

TABLE II

PREFERRED INVENTIVE TRANSPARENT GUM BASE EXAMPLES

| | AA | BB | CC | DD | EE | FF | GG | HH | II | JJ | KK | LL | MM |
|---|---|---|---|---|---|---|---|---|---|---|---|---|---|
| Polyvinyl Acetate | | | | | | | | | | | | | |
| Low Mw | 50 | 40 | 95 | 74 | — | 15 | 83 | 92.0 | 77.0 | 90 | 75 | 70 | 60 |
| Medium Mw | — | 10 | — | 15 | 81 | 80 | — | — | — | — | — | — | — |
| High Mw | 20 | 10 | — | — | 10 | — | 10 | — | — | — | 15 | 20 | 10 |
| Polyisobutylene | 20 | 30 | — | — | — | — | — | — | 18.5 | — | — | — | 20 |
| Glycerol Triacetate | 10 | 10 | 5 | 5 | 5 | — | 3 | 4.5 | 3.0 | 10 | 10 | 10 | 5 |
| Acetylated Monoglycerides | — | — | — | — | — | 3 | 4 | — | — | — | — | — | 5 |
| Partially Hydrog. Veg. Oil | — | — | — | — | — | — | — | 3.0 | — | — | — | — | — |
| Peppermint Oil | — | — | — | 6 | — | 1 | — | — | — | — | — | — | — |
| Spearmint Oil | — | — | — | — | 3 | — | — | — | 1.0 | — | — | — | — |
| Aspartame | — | — | — | — | 1 | — | — | — | — | — | — | — | — |
| Alitame | — | — | — | — | — | 1 | — | — | 0.5 | — | — | — | — |
| Thaumatin | — | — | — | — | — | — | — | 0.5 | — | — | — | — | — |
| | | | | | | | | 100% | | | | | |
| PERCENT TRANSMITTANCE (Air = 100%) | >80 | >80 | >90 | >85 | >80 | >80 | >85 | >70 | >70 | >90 | >90 | >90 | >80 |

TABLE III

PREFERRED TRANSPARENT GUM COMPOSITION EXAMPLES

| | 1 | 2 | 3 | 4 | 5 | 6 | 7 |
|---|---|---|---|---|---|---|---|
| BASE AA | 75 | — | — | — | — | — | — |
| BASE CC | — | 85 | — | — | — | — | — |
| BASE DD | — | — | 75 | — | — | — | — |
| BASE FF | — | — | — | 100 | — | — | — |
| BASE HH | — | — | — | — | 98 | — | — |
| BASE II | — | — | — | — | — | 100 | — |
| BASE KK | — | — | — | — | — | — | 80 |
| Glycerine | 10 | 5 | — | — | — | — | 5 |
| Corn Syrup | — | 5 | 10 | — | — | — | — |
| Aspartame | — | 1 | 1 | — | — | — | 1 |
| Spearmint Oil | 10 | — | — | — | — | — | 8 |
| Peppermint Oil | — | — | 9 | — | — | — | — |
| Thaumatin | — | — | — | — | — | — | 1 |
| Center Filling I | — | 3 | — | — | — | — | — |
| Center Filling II | — | — | — | — | 2 | — | 5 |
| Center Filling III | 5 | — | 5 | — | — | — | — |
| | | | | 100% | | | |
| PERCENT TRANS—MITTANCE (Air = 100%) | >75 | >85 | >80 | >80 | >70 | >70 | >85 |

The chewing gum of the invention is prepared by adding the bases of this invention to typically preheated mixing kettle such as sigma blade mixer at a temperature of approximately 45° C. The base is melted at the lowest temperature possible to achieve efficient mixing while reducing air bubbles, i.e. by using the low level vacuum. When the base is sufficiently softened, the vacuum is removed and flavor is added, and the vacuum is again resumed until the gum is homogeneous. If a high intensity sweetener such as aspartame is used, it is added last to prevent degradation caused by excess heat. The finished gum mass is then removed from the mixer and rolled, pressed or center-filled as desired.

TABLE IV

EXAMPLES OF CENTER-FILLING FORMULATIONS

| | I | II | III |
|---|---|---|---|
| SODIUM CARBOXYMETHYLCELLULOSE | 1.2 | — | — |
| GLYCERINE (99%) | 48.6 | 10.0 | — |
| SORBITOL SOLUTION (70%) | 48.8 | — | — |
| LIQUID FLAVOR | 1.2 | 1.9 | — |
| COLOR | 0.1 | 0.1 | 1.0 |
| SODIUM SACCHARIN | 0.1 | — | — |
| CORN SYRUP | — | 40.0 | — |
| INVERT SYRUP | — | 40.0 | — |
| SUCROSE | — | 2.0 | 97.0 |
| WATER | — | 6.0 | — |

TABLE IV-continued

EXAMPLES OF CENTER-FILLING FORMULATIONS

| | I | II | III |
|---|---|---|---|
| CITRIC ACID | — | — | 2.0 |
| | 100.0 | 100.0 | 100.0 |

The amount of center-filling depends upon the sizing equipment, extruder and die head. It can be adjusted as desired. A typical level of filling would be 15% of the weight of the gum composition. For example, a three gram piece of gum could contain 0.45 gram of center-filling that is injected into the gum mass so that the gum forms a shell around the center-filling, or injected into a finished gum of this invention so that a finished gum forms the shell.

What is claimed is:

1. A transparent gum base comprising:
   from about 70.0 percent to about 95.0 percent by weight of one or more elastomers selected from the group consisting of
   a polyvinyl acetate having an average GPC molecular weight from about 2,000 to about 85,000;
   a polyisobutylene having an average GPC molecular weight from about 50,000 to about 95,000; and
   a vinyl laurate-vinyl acetate copolymer having an average vinyl laurate content from about 10 percent to about 60 percent by weight of the copolymer;
   from about 1.0 percent to about 20.0 percent by weight softeners selected from the group consisting of one or more of glycerol triacetate, mono-, di- or triglycerides or acetylated mono-, di- or triglycerides, having a saponification number greater than about 350,
   and less than 1 percent by weight filler, wherein the gum base has a light transmittance of at least 60 percent using ASTM Method D1746-35, and a softening point of from about 40 3C to about 90° C., 2. The transparent gum base of claim 1 further including less than 5.0 percent by weight of opaque gum base ingredients selected from the groups consisting of an opaque elastomer, elastomer plasticizers, and waxes, softeners.

3. The transparent base of claim 1 wherein the softening point is from about 50° C. to about 70°.

4. The transparent base of claim 1 wherein said saponification number is greater than 400.

5. The transparent base of claim 1 wherein the elastomer is present from about 85 percent to about 95 percent by weight of the transparent gum base.

6. The transparent base of claim 1 wherein entrapped air bubbles are removed.

7. The transparent base of claim 1 wherein said transparent gum base has a light transmittance of greater than about 80 percent 8. The transparent base of claim 3 wherein the light transmittance is greater than about 90 percent.

9. The transparent base of claim 1 wherein the transparent ingredients used in said transparent gum base each have a light transmittance greater than 60 percent.

10. The transparent base of claim 9 wherein the light transmittance of each of the ingredient is greater than 80 percent.

11. The transparent base of claim 10 wherein the light transmittance of each of the ingredients is greater than 90 percent.

12. The transparent base of claim 11 wherein the softener is present from about 3 percent to about 12 percent by weight of the gum base.

13. The transparent base of claim 1 wherein said transparent gum base further contains flavor and/or high intensity sweeteners alone or in combination.

14. The transparent base of claim 13 wherein the additional flavor is present up to about 14.0 percent by weight.

15. The transparent base of claim 13 wherein the additional high intensity sweetener is present up to about 2.0 percent.

16. The transparent base of claim 14 wherein the additional flavor is present from about 0.1 percent to about 7.0 percent.

17. The transparent base of claim 15 wherein the additional sweetener is present from about 0.02 to about 1.0 percent.

18. The transparent base of claim 11 wherein the high intensity sweetener is selected from one or more of aspartame, acesulfame-potassium, alitame, thaumatin, monellin and saccharin.

19. The transparent base of claim 1 wherein said transparent base further contains a colorant.

20. The transparent base of claim 18 wherein the colorant is present from about 0.01 percent to about 1 percent by weight of the transparent gum base.

21. The transparent base of claim 1 wherein the transparent base contains no solid filler.

22. The transparent base of claim 10 wherein the oil-soluble flavor is used as a further softener for the transparent gum base.

23. The transparent base of claim 1 wherein said transparent gum base is a bubble gum base.

24. The transparent base of claim 1 wherein the transparent gum base comprises
   about 70 percent to about 95 percent polyvinyl acetate having an average GPC molecular weight from about 7,000 to about 60,000; and
   from about 3 percent to about 12 percent by weight of softener selected from acetylated monoglyceride and glycerol triacetate.

25. The transparent base of claim 24 wherein entrapped air bubbles are substantially removed.

26. The transparent base of claim 24 wherein the polyvinyl acetate has an average GPC molecular weight of from about 2,000 to less than 15,000.

27. The transparent base of claim 26 wherein the polyvinyl acetate has an average GPC molecular weight from about 10,000 to about 14,000.

28. The transparent base of claim 24 wherein the polyvinyl acetate is a blend of high and low molecular weights and is present in a ratio of high to low from about 2:1 to about 1:9.

29. The transparent base of claim 28 wherein the high polyvinyl acetate has an average GPC molecular weight of from 45,000 to about 95,000.

30. The transparent base of claim 29 wherein the molecular weight polyvinyl acetate has an average GPC molecular weight of from about 46,000 to about 55,000.

31. The transparent base of claim 24 wherein the polyvinyl acetate is a blend of medium and low molecular weights and is present in a ratio of medium to low from about 7:1 to about 1:7.

32. The transparent base of claim 31 wherein the medium molecular weight polyvinyl acetate has an average GPC molecular weight of from about 15,000 to about 45,000.

33. The transparent base of claim 32 wherein the medium molecular weight polyvinyl acetate has an average GPC molecular weight of from about 25,000 to about 35,000.

34. The transparent base of claim 24 wherein the polyvinyl acetate is a blend of high and medium molecular weights and is present in a ratio of high to medium from about 1:1 to about 1:8.

35. The transparent base of claim 34 wherein said softener is an acetylated monoglyceride having saponification number greater than 400.

36. The transparent base of claim 35 further including 1 percent to about 5 percent hydrogenated vegetable oil.

37. The transparent base of claim 24 further including 5 percent to about 35 percent polyisobutylene.

38. The transparent base of claim 37 wherein said polyisobutylene is present from about 17 percent to about 31 percent.

39. The transparent base of claim 38 wherein said polyisobutylene has a GPC molecular weight of from about 45,000 to about 90,000.

40. The transparent base of claim 39 wherein said polyisobutylene has a GPC molecular weight of from about 55,000 to about 78,000.

41. The transparent base of claim 24 further including from about 1 to about 3 percent terpene resin.

42. A transparent chewing gum comprising:
a) at least 75 percent by weight of the gum a transparent gum base comprising:
from about 70.0 percent to about 95.0 percent by weight of one or more elastomers selected from the group consisting of
a polyvinyl acetate having an average GPC molecular weight from about 2,000 to about 85,000;
a polyisobutylene having an average GPC molecular weight from about 50,000 to about 95,000; and
a vinyl laurate-vinyl acetate copolymers having an average vinyl laurate content from about 10 percent to about 60 percent by weight of the copolymer;
from about 1.0 percent to about 20.0 percent by weight softeners selected from the group consisting of one or more of glycerol triacetate, mono-, di- or triglycerides or acetylated mono-, di- or triglycerides glycerides having a saponification number greater than about 350,
and less than 1 percent by weight filler, wherein the gum base has a light transmittance of at least 60 percent using ASTM Method D1746-35, and a softening point of from about 40 3C to about 90° C.,
b) up to about 10.0 percent by weight of oilsoluble or water-soluble flavors, and
c) up to about 1.0 percent by weight high intensity sweetener.

43. The gum composition of claim 42 containing at least 95 percent of said gum base.

44. The gum composition of claim 43 wherein entrapped air bubbles are substantially removed.

45. The gum composition of claim 43 including from about 1.0 percent to about 5.0 percent by weight oil-soluble flavor and from about 0.01 percent to about 0.7 percent high intensity sweetener, by weight of the transparent gum base.

46. The gum composition of claim 45 wherein the transparent chewing gum base of the transparent gum includes 70 percent to about 95 percent polyvinyl acetate having an average GPC molecular weight form about 7,000 to about 60,000, and from about 3 percent to about 12 percent glycerol triacetate, 47. The gum composition of claim 46 wherein entrapped air bubbles are substantially removed.

48. The gum composition of claim 42 wherein the transparent chewing gum is a bubble gum.

49. The gum composition of claim 43 wherein said chewing gum contains a center-filling.

50. The gum composition of claim 49 wherein the outer portion of said gum has a transparency greater than 60 percent 51. The gum composition of claim 50 wherein the outer portion of said gum has a transparency greater than 80 percent.

52. The gum composition of claim 51 wherein the outer portion of said gum has a transparency greater than 85 percent.

53. The gum composition of claim 49 wherein said center filling is not transparent.

54. The gum composition of claim 53 herein the center filling of said chewing gum contains one or more ingredients selected from color, sweetener, and flavor.

55. The gum composition of claim 43 wherein said chewing gum is formed into a shape selected from sticks, balls, fruit shapes, tablets and novelty figures.

56. The gum composition of claim 55 wherein the base portion of said formed gum, excluding the center filling, has a transparency greater than 60 percent.

57. The gum composition of claim 55 wherein the base portion of said formed gum, excluding the center filling, has a transparency greater than 80 percent.

58. The gum composition of claim 49 wherein the center filling is transparent.

* * * * *